April 30, 1968     MINORU UMAHASHI     3,380,365
AUTOMATIC COPYING APPARATUS
Filed April 23, 1965
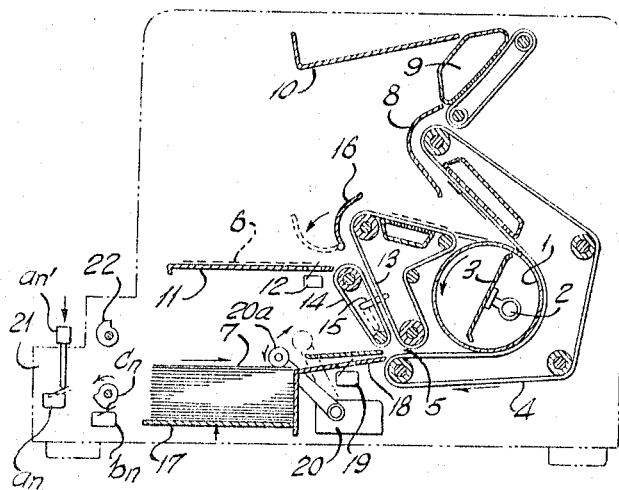
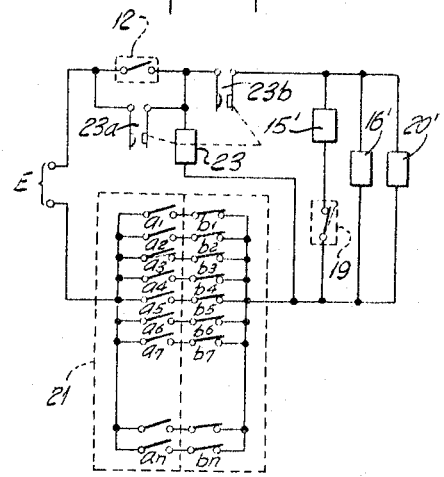
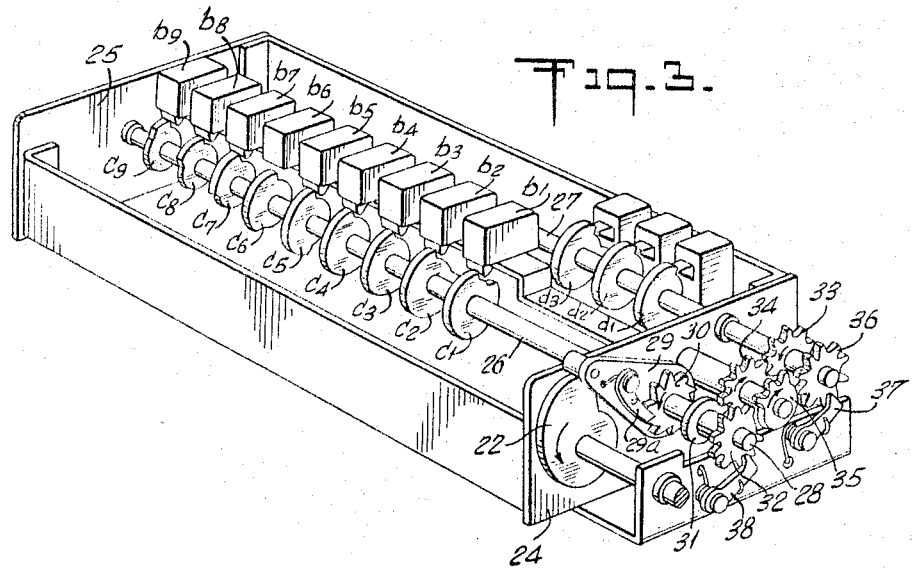
INVENTOR
MINORU UMAHASHI
BY
Burgess, Ryan & Hicks
ATTORNEYS

United States Patent Office 3,380,365
Patented Apr. 30, 1968

3,380,365
AUTOMATIC COPYING APPARATUS
Minoru Umahashi, Tokyo, Japan, assignor to Kabushiki
Kaisha Ricoh, Tokyo, Japan, a corporation of Japan
Filed Apr. 23, 1965, Ser. No. 450,416
Claims priority, application Japan, Apr. 28, 1964,
39/24,073
6 Claims. (Cl. 95—75)

ABSTRACT OF THE DISCLOSURE

A copying machine equipped with automatic electric control which will permit the operator to set the machine for any desired number of copies, and the machine will then produce this number and come to a halt.

---

This invention relates to a device for automatically making a predetermined number of copies from an original in a copying machine. With a copying apparatus of ordinary construction, copies are made by manually superposing an original paper on a sheet of sensitized paper and inserting them into such copying apparatus, wherein exposure and development are effected. Accordingly, it not only takes too much time and labor because of one-original-for-one-copy method, but also, in obtaining many copies, the operator has to attend to the apparatus until all copies required are made, because he has to supply sensitized paper for each exposure and development. This is surely too inefficient.

The invention mainly relates to the automatization of copying apparaus. With a copying apparatus which uses the diazo method, "automatic system" has been considered to include a mechanism which automatically separates the original from the sensitized paper after exposure and sends the latter onto the developing section. As a copying method to automatically insert the original and the sensitized paper into the exposure section for continuous exposures, one mechanism in which the original is wound on the surface of the exposure cylinder beforehand and others have been considered. But there are many defects involved in those methods, for instance:

(1) The lengthwise dimension of the original must be shorter than the outside circumference of the exposure cylinder.

(2) The mechanism and the operation for the easy winding and removal of the original on and off the exposure cylinder are complicated.

(3) The mechanism which lets the ends of both the original and the sensitized paper meet each other is complicated.

(4) The counter mechanism which is preset for the number of copies required is complicated.

For those reasons and others, copying apparatus which can take many copies from one original has very rarely been put to practical use, but the aforementioned manually superposed and conveyed method has been used in almost all cases.

The purpose of the invention is to correct the various defects enumerated above and to supply a fully automatic copying apparatus of high efficiency in which both the original and the sensitized paper are automatically superposed and are conveyed into the exposure section.

These and other advantages of the present invention will be apparent from an understanding of the present invention, which is fully described below with reference to the accompanying drawing, in which:

FIG. 1 is a cross sectional view of the main portion of one example of a copying apparatus incorporating this invention;

FIG. 2 is one example of a wiring diagram of the electric circuit used in such copying apparatus; and FIG. 3 is a perspective view of one example of a mechanism which counts the number of copies made with such copying apparatus.

The exposure cylinder 1 illustrated in FIG. 1, as generally known, incorporates the light source lamp 2 and the reflector plate 3 in it; the exposure cylinder is so constructed that it can freely rotate within the loop formed by the drive belt 4 which is stretched on several rollers; the sensitized paper 7 with the original 6 superposed thereon enter the exposure slit 5 and are exposed while they move within the loop, keeping contact in between the said exposure cylinder and the belt; and both the original and the sensitized paper are carried upwards from the rear of the exposure cylinder.

Various methods have been used to automatically separate the sensitized paper from the original and in the example illustrated in FIG. 1, it is assumed that "vacuum system" for automatic separation is used. The detailed description of the mechanism for automatic separation is omitted here. The original 6 and the sensitized paper 7 which are carried upwards from the rear of the exposure cylinder, as mentioned above, are automatically separated off each other at this spot; the exposed sensitized paper is guided into the curved plate 8 and is carried to the board 10 after being developed in the ammonia developing section 9. The whole composition described above has the same mechanism as that used in an ordinary copying apparatus.

On the other hand, the original 6 separated from the sensitized paper is carried back to the exposure slit 5 by means of a mechanism to be described later. In FIG. 1, 11 indicates the insertion table for the original 6, and, under the table 11, the normally open micro-switch 12 of which the contacts are caused to close by insertion of the sensitized paper 7. In the space surrounded by the original insertion table 11, the front portion of the exposure cylinder 1, and the exposure slit 5, the belt 13 for the original to be carried back is stretched on appropriate rollers. In addition between the original insertion table 11 and the exposure slit 5, the belt 14 for the original to be carried forward is stretched parallel with the belt 13, and these two belts form the guiding channel for the original to be guided to the exposure slit 5. Within the loop formed by the belt 14, the impedance plate 15 is installed at an appropriate location whereby the ends of both the original and the sensitized paper can be matched to each other.

The impedance plate 15 is actuated by an electromagnet plunger or the actuator source 15' (see FIG. 2) such as a rotary electro-magnet. The impedance plate 15 stretches out into the above mentioned guiding channel and hinders the advance of the original. When the transmittal of electricity to the actuator source 15' such as the above-mentioned electro-magnet is cut off, the impedance plate 15 turns back into the loop (see dotted line position), whereby the original is carried to the exposure slit 5.

In the entrance to the original guiding channel, the course switching guide plate 16 is installed to send the original, automatically separated off the exposed sensitized paper, to the original insertion table 11 or to the exposure section. The guide plate 16 is equipped with the actuator source 16' (see FIG. 2) such as an electro-magnet plunger. While electricity is being transmitted to the actuator source 16', the said guide plate 16 lets the original be carried back to the guiding channel. When electricity is cut off, the guide plate 16 turns back to the position as illustrated by the dotted line and lets the original be carried back to the original insertion table 11.

The numeral 17 indicates the feeder for the sensitized paper which is so constructed to be movable upwards and downwards and to move upwards during the copy work, depending upon the quantity of sensitized papers piled thereon, thus keeping the top surface of the sensitized papers at a fixed level regardless of the quantity. From the sensitized paper feeder 17, the guide plate 18 for the sensitized paper 7 protrudes towards the exposure slit 5. The said guide plate is equipped with the normally closed micro-switch 19 the contacts of which open when the sensitized paper 7 is carried along the plate. In addition, near the said feeder (under the sensitized paper guide plate 18 in the example illustrated in FIG. 1), the sensitized paper feeding device 20 is installed to automatically send the sensitized paper out. The device 20 is equipped with, for example, the rotary friction roller 20a, such as used in a printing machine of ordinary construction. The said friction roller is mounted on the free end of the oscillatory arm protruding from the sensitized paper feeding device 20, and it runs interlockedly with the drive section of the exposure cylinder 1 and keeps rotating while the said drive section is in operation. By the action of the electro-magnet clutch 20' (see FIG. 2) incorporated in the sensitized paper feeding device, the friction roller 20a, as illustrated by the actual line in FIG. 1, is pressing on the top surface of sensitized papers piled in the stacker 17, and automatically supplies the sensitized paper 7 to the exposure slit 5. The electricity transmitting mechanism to the electro-magnet clutch incorporated in the sensitized paper feeding device 20 may be interlocked with the drive belt such as 4, 13, 14, and others, or it may be installed in the original guiding channel. It is so constructed as to supply the sensitized paper in response to closing of switch 12 by the original.

In an appropriate location of this copying apparatus (in the front space of the sensitized paper stacker 17 in the example illustrated in FIG. 1), the memory counter device 21 is installed. The counter device 21 is composed of the memory device which is preset for the number of copies to be taken from one original and of the portion which automatically counts the number of copies each time when one sheet of sensitized paper is supplied. As illustrated in FIG. 2, the group of switches $a1$, $a2$, $a3$ . . . $an$ having the normally open contacts and the switches $b1$, $b2$, $b3$ . . . $bn$ having the normally closed contacts are connected in series in the respective groups. In addition, those two groups of switches, $an$ and $bn$, are connected in parallel to each other. Each of the normally open switches $an$ is equipped with a push button, $an'$, and the contacts of the $an$ switches are caused to close when the button $an'$ is pushed. The contacts of the normally closed switches $bn$ are caused to open, one by one with smaller numbers earlier, by the cam plate 22 (FIG. 3) which is actuated interlockedly with the paper feeding device 20, each time when a sheet of the sensitized paper 7 is supplied to the exposure slit 5. (Thus, the number of copies taken is automatically counted.) When the sensitized paper for the last copy is supplied, the electric circuit is released, by the action of the cam plate 22, to automatically stop the copy work. In other words, the counter device as illustrated in FIG. 3 is so constructed as to open or close the normally closed switches on a decimal principle. In FIG. 3, each of the nine cams $c1$, $c2$, $c3$ . . . $c9$ having each a different angle is, at appropriate intervals mounted on the shaft 26 which is supported by the end plates 24 and 25 attached to the side walls of this copying apparatus, and the group of the said normally closed switches $b1$, $b2$, $b3$ . . . $b9$ is installed to correspond to the group of the cams $c1$, $c2$, $c3$ . . . $c9$. On the shaft 27, installed in parallel to the shaft 26 is the group of the cams $d1$, $d2$, $d3$ . . . $d9$, to count the second digits which are equipped with the corresponding normally closed switches in the same manner as described above for the $bn$ switches. The shafts 26 and 27 protrude through the above-mentioned end plate 24 and mounted on and keyed to the shaft 26 are; the gear 30 (with 10 teeth) which rotates counterclockwise one pitch by the combined action of the spring loaded oscillatory arm lever 29 engaged by the said cam plate 22 actuated interlockedly with the sensitized paper feeding device and of the claw 29a installed on the arm lever 29; the disk 31 with one protruded appendix (the number of appendix versus the number of teeth of the above-mentioned gear being 1 to 10) interlocking the counter with the second unit digits; and the gear 32 with irregularly located pitches (with 9 pitches) to set the counter back (to zero). The oscillatory arm lever 29 is loosely engaged on the shaft 26, and makes a round trip along the circumferential surface of the cam plate 22 when the latter rotates by one whole turn in the direction as illustrated by the arrow. By the action of the claw 29a installed on the arm lever 29, the gear 30 moves forward (counterclockwise) by one pitch, causing the group of cams $c1$, $c2$, $c3$ . . . $c9$ to rotate, and causing the normally closed switches corresponding to the cams to open, in succession, thus counting the number of sensitized papers supplied. Furthermore, the disk 31 with a protruded appendix is so arranged as to transmit an intermittent rotation action, by way of the intermediary gear 34 (with 10 pitches) to the gear 33 (with 10 pitches) keyed to the shaft 27. In other words, one rotation of the disk 31 causes one pitch of the gears to be sent forward, thus counting the digits of the second unit.

The said gear 32 to set the counter back is, through the medium of the partially pitched gear 35 (with 7 to 10 pitches), engaged with the irregularly pitched gear 36 (with 9 pitches), and, by several clockwise rotations of the said partially pitched gear 35, the counter device is set back to its original position (zero position) at the time of starting. By way of explanation, the gears 32 and 36 to set the counter back are equipped respectively with the ratchets 38 and 37 to insure the rotation of the gears one pitch at a time. As illustrated in FIG. 2, in the electric circuit of the copying apparatus hitherto described, the actuator source 20' incorporated in the sensitized paper feeding device 20 and the group of the switches equipped in the counter device are connected in series, through the medium of the normally open micro-switch 12, to the power source E, while the said actuator 20', the actuator source 15' incorporated in the impedance plate 15 and the actuator 16' in the sensitized paper feeding guide plate 16 are connected in parallel. By way of explanation, the relay 23 incorporated in the said electric circuit is a self-hold relay, and the contact 23a of the said relay 23 is connected in parallel and the contact 23b in series, to the micro-switch 12. Thus, even when the normally open micro-switch 12 opens, the relay 23 continues to hold its own circuit.

In making, for example, 3 copies from one original, the first process is to cause the contacts of the normally open switch $a3$ to close by pushing the push button $a3'$ of the counter device 21. Then, the original 6 is inserted into the original insertion table 11, causing its front end to push the actuator lever of the micro-switch 12 whereby the micro-switch 12 is closed; electricity starts running from the power source E, is transmitted to the relay 23 as illustrated in FIG. 2, causes the contacts 23a and 23b of the relay to close, then is transmitted to the actuator source 20' and 16' and the actuator source 15' in the impedance plate 15. Electricity transmitted as described above causes the said guide plate 16 to be shifted to a position (as illustrated by the solid line in FIG. 1) that enables the original to be automatically carried back to the exposure slit 5 and the impedance plate 15 to be shifted to the original guiding channel. Thus, the friction roller 20a installed to the sensitized paper feeding device 20 causes one sheet of sensitized paper piled to be sent out. On the other hand, the said original inserted is carried through the guiding channel formed by the conveyor belt 14 and the feed-back belt 13, and its advance is temporarily hindered by the impedance plate 15. The sensitized paper sent out by the friction roller 20a is carried on the guide plate 18 towards the exposure slit 5, and pushes down the actuator lever of the normally closed switch 19 installed to the guide plate 18, causing the switch 19 to open. When the switch 19 opens, the transmittal of electricity to the actuator source 15' in the impedance plate 15 is cut off, so the impedance plate 15 turns back to the loop formed by the conveyor belt 14 (as shown in dashed lines). Thus, the said original of which the advance has been hindered by the impedance plate is carried forward towards the exposure slit 5, where the ends of both the original and the sensitized paper are matched to each other and the former is superposed on the latter, and then they are carried further to the exposure section. In due course of time, both the original and the sensitized paper after being developed are separated off each other by the already-mentioned automatic separation device, and the latter is sent to the developing section 9. The whole process described hitherto completes the copy work of one copy. The cam plate 22 interlocked with the sensitized feeding device 20, at the same time as it completes to send out one sheet of sensitized paper and turns back to its orginal position, is actuated, causing the normally closed switch b1 to open and counting the number of sensitized paper sent out. On the other hand, the original separated off the sensitized paper is, by the guide plate 16, guided back to the carriage channel formed by the feed-back belt 13 and the conveyor belt 14.

Switches b1, b2 and finally b3 are opened in succession as the first, second and third copies, respectively, are made. When the contacts of the last switch b3 is opened the transmittal of electricity to the said electric circuit is cut off, preventing the sensitized paper to be further supplied. Thus, the impedance plate 15 turns back to the loop formed by the belt 14, the guide plate 16 to the original position (as illustrated by the dotted line in FIG. 1) on the original insertion table 11, and the original separated off the last exposed sensitized paper is carried back to the original insertion table. Thus, the copy work of copies required is finished.

As described herein, with the apparatus incorporating this invention, it is possible to achieve the expected purpose described at the beginning of this specification, by merely presetting the counter for the number of copies required and inserting the original.

Having fully described the invention, what is claimed as new and desired to be secured by Letters Patent is:

1. In a copying apparatus, a device to automatically separate the original off the exposed sensitized paper, an original insertion table, a sensitized paper storage stand with sensitized papers piled thereon, interlocked with the drive section of the exposure mechanism, to automatically send out the top sheet of sensitized paper, intersecting guiding channels for the original and for the sensitized paper, an impedance plate to temporarily hinder the advance of the original is installed in the original guiding channel, while in the sensitized paper guiding channel in which the said sensitized paper is carried towards the said exposure mechanism, there is a switch which is actuated by the passage of said sensitized paper through its said channel, thus causing the said impedance plate to turn outside the said original guiding channel, allowing the said original to advance and to be automatically superposed on the said sensitized paper, and causing them to be carried into the said exposure mechanism, a presettable counter device in which plural sets of normally open switches and normally closed switches connected in series to each other are connected in parallel to the said normally closed switch in the said sensitized paper guiding channel, in which the said normally open switches in the said counter devices are preset for the number of copies to be taken, and in which a part interlocked with the sensitized paper feeding device causes the said normally closed switches in the said counter devices to open in succession, whereby the number of copies preset for can be made.

2. In a copying machine having an insertion plate and a guiding channel for the original to be copied, a supply of sensitized paper and a feed channel therefor adapted to permit superimposition of said original and said sensitized paper, an exposure device for the superimposed materials and means for separating the thing to be copied and the sensitized paper sheet, the combination of an automatic presettable counting device comprising an electric switch adapted to be actuated by said original, an electric switch adapted to be actuated by said sensitized paper, a feed mechanism to feed a top sheet of sensitized paper from a pile thereof into a guiding channel and passed said last mentioned switch, a movable gate adapted to return said original to said insertion plate or to the guiding channel for said original, a swingable stop device in said guiding channel for said original, a number of normally open switches paired with and arranged in series with a number of normally closed switches, said groups of open and closed switches being in series with a source of current and various controls of said copying machine, means for closing anyone of said normally open switches, means for opening each normally closed switch in sequence one after the other commencing with the first, means for activating the various controls of the machine to make repeated copies until the preset number of normally closed switches are opened thus breaking the electrical circuit to the controls and causing discontinuance of the copying cycle.

3. In a copying machine having an insertion plate for the original which is to be copied, a guiding channel for said original, a supply of sensitized paper, a guiding channel for said sensitized paper intersecting with said guiding channel for said original to permit superimposition of one paper on the other, exposure means, and means for separating said original from said sensitized paper after exposure, the combination of a control for an electric switch in the path of said original as it moves from said plate to said original guiding channel, an electrically controlled "on-off" stop in said original guiding channel adapted to stop said original when in "on" position and permit the original to pass through said channel when in "off" position, an electrically controlled feed means for said sensitized paper adapted to feed the top sheet from a pile into said sensitized sheet guiding channel, an electric switch in said sheet guiding channel adapted to be opened by the passage of a sensitized sheet, a two-position gate for directing said original back to said insert plate or to said original guiding channel after separation of said original and said sensitized paper sheet, electrical means for actuating said gate, a group of normally open switches, a group of normally closed switches paired with said open switches and in series therewith, each group and switch in a group connected to an opposite pole of electric energy and all in circuit with the various means for actuating the devices in said copying machine for controlling the flow of said original and said sensitized paper, means for holding closed anyone of the normally open switches, means for sequentially opening each of said normally closed switches, said latter means controlled by said means for feeding each sensitized sheet so that as each sheet is fed from the pile one of said normally closed switches is opened each in sequence from the first to the last until that one which is in series with the normally open switch which has been closed by hand is reached when the circuit to the copying machine is broken and the machine ceases to copy.

4. In an electric powered copying machine having an insertion plate for the original which is to be copied, a guiding channel for said original, a supply of sensitized paper, a guiding channel for said sensitized paper intersecting with said guiding channel for said original to permit superimposition by one paper on the other, exposure means, and means for separating said original from said sensitized paper after exposure, the combination of a group of normally open electric switches, a group of normally closed electric switches paired with said open switches and in series therewtih, each group and switch in a group connected to an opposite pole of electric energy and all in circuit with the means for actuating the devices in said copying machine for controlling the flow of said original and said sensitized paper through the machine, means for holding closed anyone of the normally open switches, means for sequentially opening each of said normally closed switches, said latter means controlled by said means for feeding each sensitized sheet so that as each sheet is fed from the pile of such sheets one of said normally closed switches is opened each in sequence from the first to the last until that one which is in series with the normally open switch which has been closed by the operator is reached when the circuit to the copying machine is broken and the machine ceases to make any more copies.

5. In a copying machine having an insertion plate for the original which is to be copied, a guiding channel for said original, a supply of sensitized paper, a guiding channel for said sensitized paper intersecting with said guiding channel for said original to permit superimposition of one paper on the other, exposure means, and means for separating said original from said sensitized paper after exposure, the combination of a control for an electric switch in the path of said original as it moves from said plate to said original guiding channel, an electrically controlled "on-off" stop in said original guiding channel adapted to stop said original when in "on" position and permit the original to pass through said channel when in "off" position, an electrically controlled feed means for said sensitized paper adapted to feed the top sheet from a pile into said sensitized sheet guiding channel, an electric switch in said sheet guiding channel adapted to be opened by the passage of a sensitized sheet, a two-position gate for directing said original back to said insert plate or to said original guiding channel after separation of said original and said sensitized paper sheet, electrical means for actuating said gate, a group of normally open switches, a group of normally closed switches paired with said open switches and in series therewith, each group and switch in a group connected to an opposite pole of electric energy and all in circuit with the various means for actuating the devices in said copying machine for controlling the flow of said original and said sensitized paper, manual means for holding closed anyone of the normally open switches, a series of progressively offset cams on a rotatable shaft for sequentially opening each of said normally closed switches, said latter means controlled by said means for feeding each sensitized sheet so that as each sheet is fed from the pile one of said normally closed switches is opened each in sequence from the first to the last until that one which is in series with the normally open switch which has been closed by hand is reached when the circuit to the copying machine is broken and the machine ceases to copy.

6. In an electric powered copying machine having an insertion plate for the original which is to be copied, a guiding channel for said original, a supply of sensitized paper, a guiding channel for said sensitized paper intersecting with said guiding channel for said original to permit superimposition by one paper on the other, exposure means, and means for separating said original from said sensitized paper after exposure, the combination of a group of normally open electric switches, a group of normally closed electric switches paired with said open switches and in series therewith, each group and switch in a group connected to an opposite pole of electric energy and all in circuit with the means for actuating the devices in said copying machine for controlling the flow of said original and said sensitized paper through the machine, means for holding closed anyone of the normally open switches, means for sequentially opening each of said normally closed switches, said latter means comprising a series of progressively offset cams mounted on a revolvable shaft and adapted to sequentially open said normally closed switches upon rotation of said revolving shaft which is accomplished by means of a cam operated ratchet and said latter means controlled by said means for feeding each sensitized sheet so that as each sheet is fed from the pile of such sheets one of said normally closed switches is opened each in sequence from the first to the last until that one which is in series with the normally open switch which has been closed by the operator is reached when the circuit to the copying machine is broken and the machine ceases to make any more copies.

References Cited
UNITED STATES PATENTS 2,927,210    3/1960    O'Mara _____ 95—75 X

FOREIGN PATENTS 951,235    3/1964    Great Britain.

NORTON ANSHER, *Primary Examiner.*

M. H. HAYES, *Assistant Examiner.*